(12) United States Patent
Maurice et al.

(10) Patent No.: US 11,787,136 B2
(45) Date of Patent: Oct. 17, 2023

(54) METHOD FOR MANUFACTURING AN OPHTHALMIC LENS TO BE MOUNTED IN A FRAME, OPHTHALMIC LENS, FRAME AND EYEGLASSES EQUIPMENT

(71) Applicant: Essilor International, Charenton-le-Pont (FR)

(72) Inventors: Sébastien Maurice, Charenton-le-Pont (FR); Thierry Baudart, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 245 days.

(21) Appl. No.: 17/051,497

(22) PCT Filed: May 7, 2019

(86) PCT No.: PCT/EP2019/061734
§ 371 (c)(1),
(2) Date: Oct. 29, 2020

(87) PCT Pub. No.: WO2019/215188
PCT Pub. Date: Nov. 14, 2019

(65) Prior Publication Data
US 2021/0308971 A1    Oct. 7, 2021

(30) Foreign Application Priority Data
May 9, 2018    (EP) .................................... 18305574

(51) Int. Cl.
*B29D 11/00*    (2006.01)
*G02C 1/00*    (2006.01)
*B33Y 80/00*    (2015.01)

(52) U.S. Cl.
CPC .. *B29D 11/00009* (2013.01); *B29D 11/00942* (2013.01); *G02C 1/10* (2013.01); *B33Y 80/00* (2014.12)

(58) Field of Classification Search
CPC ........ B29D 11/00009; B29D 11/00942; G02C 1/10; B33Y 80/00
See application file for complete search history.

(56) References Cited

U.S. PATENT DOCUMENTS

| | | | |
|---|---|---|---|
| 4,313,652 | A | 2/1982 | Berman |
| 6,250,759 | B1 | 6/2001 | Kerns, Jr. et al. |

(Continued)

FOREIGN PATENT DOCUMENTS

| | | | |
|---|---|---|---|
| CN | 201029009 Y | | 2/2008 |
| EP | 2425926 | * | 3/2012 |

(Continued)

OTHER PUBLICATIONS

International Search Report for PCT/EP2019/061734 dated Jul. 10, 2019, 4 pages.

(Continued)

*Primary Examiner* — Mathieu D Vargot
(74) *Attorney, Agent, or Firm* — NIXON & VANDERHYE (57) ABSTRACT

Disclosed is a method for manufacturing an ophthalmic lens to be mounted in a frame, the ophthalmic lens including an optical front face, an optical rear face, and a peripheral edge that surrounds the optical front and rear faces and that has a base portion carrying a fixing unit suitable for attaching the ophthalmic lens to at least a part of the frame, the method includes the steps of: determining a central part of the ophthalmic lens that includes at least one of the optical front face and the optical rear face; determining the peripheral edge with the fixing unit; calculating a planned manufac- (Continued)

tured device including both the fixing unit and the central part together; and manufacturing, using an additive manufacturing technology, the planned manufactured device in order to form the ophthalmic lens.

22 Claims, 3 Drawing Sheets

(56) References Cited

U.S. PATENT DOCUMENTS

| | | | |
|---|---|---|---|
| 10,012,846 B1* | 7/2018 | Santinelli | G02C 1/10 |
| 2002/0029408 A1 | 3/2002 | Lindahl | |
| 2011/0037945 A1 | 2/2011 | Wiand | |
| 2012/0019770 A1 | 1/2012 | Dichiara | |
| 2012/0058714 A1 | 3/2012 | Lemaire et al. | |
| 2013/0314660 A1 | 11/2013 | Chen | |
| 2014/0125940 A1 | 5/2014 | Tsai | |
| 2016/0114542 A1 | 4/2016 | Quere et al. | |
| 2016/0306187 A1 | 10/2016 | Luderich et al. | |
| 2016/0311184 A1 | 10/2016 | Gourraud | |
| 2018/0133989 A1 | 5/2018 | Nagao et al. | |

FOREIGN PATENT DOCUMENTS

| | | |
|---|---|---|
| FR | 2 464 496 | 3/1981 |
| JP | S56-052718 A | 5/1981 |
| JP | 2016-525967 A | 9/2016 |
| JP | 2017-502334 A | 1/2017 |
| WO | 2014/195654 | 12/2014 |
| WO | 2015/086981 | 6/2015 |
| WO | 2016/208584 A1 | 12/2016 |

OTHER PUBLICATIONS

Written Opinion of the ISA for PCT/EP2019/061734 dated Jul. 10, 2019, 7 pages.
Office Action issued in Japanese Patent Application No. 2020-562687 dated Dec. 23, 2022.

* cited by examiner

METHOD FOR MANUFACTURING AN OPHTHALMIC LENS TO BE MOUNTED IN A FRAME, OPHTHALMIC LENS, FRAME AND EYEGLASSES EQUIPMENT

CROSS-REFERENCE TO RELATED APPLICATIONS

This application is the U.S. national phase of International Application No. PCT/EP2019/061734 filed May 7, 2019 which designated the U.S. and claims priority to EP 18305574.8 filed May 9, 2018, the entire contents of each of which are hereby incorporated by reference.

TECHNICAL FIELD OF THE INVENTION

The invention relates to the manufacturing of ophthalmic lenses.

More precisely the invention relates to a method for manufacturing an ophthalmic lens to be mounted in a frame, the ophthalmic lens comprising an optical front face, an optical rear face, and a peripheral edge that surrounds said optical front and rear faces and that has a base portion carrying fixing means suitable for fixing the ophthalmic lens to at least a part of the frame.

The invention also describes an ophthalmic lens to be mounted in a frame, a frame suitable for holding an ophthalmic lens and an eyeglasses equipment.

BACKGROUND INFORMATION AND PRIOR ART

The technical part of the profession of an optician consists in mounting a pair of correcting ophthalmic lenses in an eyeglass frame selected by a wearer.

This mounting comprises at least five main operations:
acquiring the shape of a longitudinal profile representative of the shape of the outline of one of the surrounds of the selected eyeglass frame;
ordering a lens in accordance with filter needs an/or compensation of vision defect of the wearer;
centering the ophthalmic lens under consideration, i.e. positioning and orienting said longitudinal profile appropriately on the lens, in such a manner that once machined to have this profile and then mounted in its frame, the lens is positioned correctly relative to the corresponding eye of the wearer, so as to enable it to perform as well as possible the optical function for which it is designed;
shaping the lens, i.e. machining its outline to have the shape of the centered longitudinal profile; and then assembling the lens together with the frame.

With rimmed eyeglass frames, the surround (or "rim") is designed to surround the entire periphery of the lens. Shaping then involves a beveling operation which consists in forming an engagement ridge all along the peripheral edge face of the lens for the purpose of engaging in a groove, commonly known as a bezel, that runs around the inside face of the rim of the eyeglass frame.

With half-rimmed eyeglass frames, the surround comprises a half-rim that matches the top portion of the outline of the lens, and a string that runs along the bottom portion of the outline of the lens in order to hold the lens against the half-rim. Shaping then involves a grooving operation that consists in forming an engagement groove along the peripheral edge face of the lens, with the top portion of the groove serving to receive a ridge provided along the bottom face of the half-rim and with the bottom portion of the groove serving to receive the string.

Neither of those two methods is really flexible and they limit the shape of the surround of the ophthalmic lens only to predetermined profiles that can be manufactured with these methods. These methods are also not easy to operate as they require manual heavy (and costly) operations.

Furthermore, two different manufacturing steps are necessary to obtain the final structure: firstly, manufacturing the central part of the ophthalmic lens and secondly manufacturing the surround by the two proposed methods. The two methods suffer from the disadvantage of producing some optical defects on the useful optical surface. Indeed, one can imagine that during the manufacturing of the surround the ophthalmic lens is maintained by a support which contacts the optical surface. Some heavy post-processing treatments are thus required on the ophthalmic lens surface, (such as polishing) before use.

SUMMARY OF THE INVENTION

The object of the present invention consists in improving the manufacturing of ophthalmic lenses, in order to directly obtain an ophthalmic lens ready for use, without any heavy post-processing treatment.

More precisely, the invention consists in a method for manufacturing an ophthalmic lens to be mounted in a frame as described in the introduction, the method comprising the steps of:
determining a central part of the ophthalmic lens that includes at least one of the optical front face and the optical rear face,
determining the peripheral edge with said fixing means,
calculating a planned manufactured device comprising both fixing means and said central part together, and
manufacturing, using an additive manufacturing technology, said planned manufactured device in order to form the ophthalmic lens.

Thanks to the invention, a planned device, comprising both fixing means and the central part, is calculated before the step of manufacturing. Then, the central part—which comprises at least an optical face—and the surround—which comprises the fixing means—are manufactured in a single step.

The determining steps comprise a step of acquiring a manufacturing set point during which manufacturing instructions are received or generated, said manufacturing instructions comprising instructions for producing the fixing means and instructions for producing at least a part of the thickness of said central part. The manufacturing set point thus defines the final shape of the whole ophthalmic lens.

Advantageously, no other operation using specific equipment is necessary to manufacture these parts of the ophthalmic lens. The manufacturing costs are thus reduced. Furthermore, as the fixing means is manufactured by an additive manufacturing technology, it can be directly shaped precisely to the appropriate aspect. Post-processing treatments are also noticeably reduced. Finally, thanks to the additive manufacturing technology, the fixing means can be shaped according to a large variety of profiles (which were not easy or possible to reach with the previous methods). As an example, clearance hole can be manufactured at the intended shape and location without any drilling operation.

Other advantageous features of the method are the following ones:

the fixing means comprises a strip in a groove shape or bevel shape that longitudinally extends along at least a part of the base portion of said peripheral edge, said strip comprising at least one overhang portion;

the overhang portion has a cross-section along a plane which is perpendicular to the strip, said cross-section having a width that is greater in a first area situated further from the base portion of the peripheral edge than in a second area of thinner width situated between the first area and said base portion of the peripheral edge;

after both manufacturing steps, the method comprises steps of:
polishing at least a part of the front face and/or the rear face of the ophthalmic lens; and
polishing a part of the peripheral edge;

after both manufacturing steps, the method comprises a step of machining at least a part of the front face and/or the rear face of the ophthalmic lens;

the steps of manufacturing are performed by juxtaposing continuously or discontinuously layers or voxels of material.

The invention also provides an ophthalmic lens to be mounted in a frame, comprising an optical front face, an optical rear face, and a peripheral edge that surrounds said optical front and rear faces and that has a base portion carrying fixing means suitable for fixing the ophthalmic lens to at least a part of the frame, characterized in that the fixing means and a central part of the ophthalmic lens that includes at least one of the optical front face and the optical rear face are manufactured together in one-piece using only an additive manufacturing technology.

Other advantageous features of said ophthalmic lens are the following ones:
said fixing means and said central part are made from the same material;
said fixing means comprising a strip in a groove shape or a bevel shape that longitudinally extends along at least a part of the base portion of said peripheral edge, said strip comprising at least one overhang portion;
the overhang portion has a cross-section along a plane which is perpendicular to the strip, said cross-section having a width that is greater in a first area situated further from the base portion of the peripheral edge than in a second area of thinner width situated between the first area and said base portion of the peripheral edge;
the strip has a dovetailed cross-section;
the overhang portion extends over the major part of the length of the strip;
the shape of the cross-section of the strip varies along the length of the strip;
the fixing means is manufactured with an asymmetrical shape;
the fixing means comprises a notch that has a projecting or recessed shape and that extends along only a minor part of the length of the peripheral edge;
the notch has a recessed shape and houses a locking means suitable for locking the ophthalmic lens to the frame;
said locking means is a screw or a lug;
the fixing means comprising a strip in a groove shape or a bevel shape that comprises side faces, said side faces being tilted, the slope of at least one of said faces varying along the length of said peripheral edge;
the fixing means comprising a strip in a groove shape or a bevel shape that extends over a longitudinal trace, the distance of said longitudinal trace relative to said optical front face varying along the length of said peripheral edge;
the fixing means comprising a strip in a groove shape or a bevel shape that comprises at least a first part and a second part, the first part being groove-shaped and the second part being bevel-shaped.

The invention also consists in a frame suitable to hold an ophthalmic lens, comprising a bridge, temples and attaching means suitable for fixing the ophthalmic lens, characterized in that said attaching means comprises a relief pattern that has a projecting or recessed shape and that comprises at least one overhang portion.

Other advantageous features of said frame are the following ones:
the relief pattern has a dovetailed cross-section;
the frame also comprises a rim suitable to surround at least a part of said ophthalmic lens;
the relief pattern comprises a strip in a groove shape or a bevel shape that longitudinally extends along at least a part of the rim.

The invention also consists in an eyeglasses equipment comprising a frame and an ophthalmic lens as described previously.

DETAILED DESCRIPTION OF EXAMPLE(S)

The following description with reference to the accompanying drawings, given by way of non-limiting example makes it clear what the invention consists in and how it can be reduced to practice.

The present invention relates in general to eyeglasses.

Figures 2, 3, 4, 5:
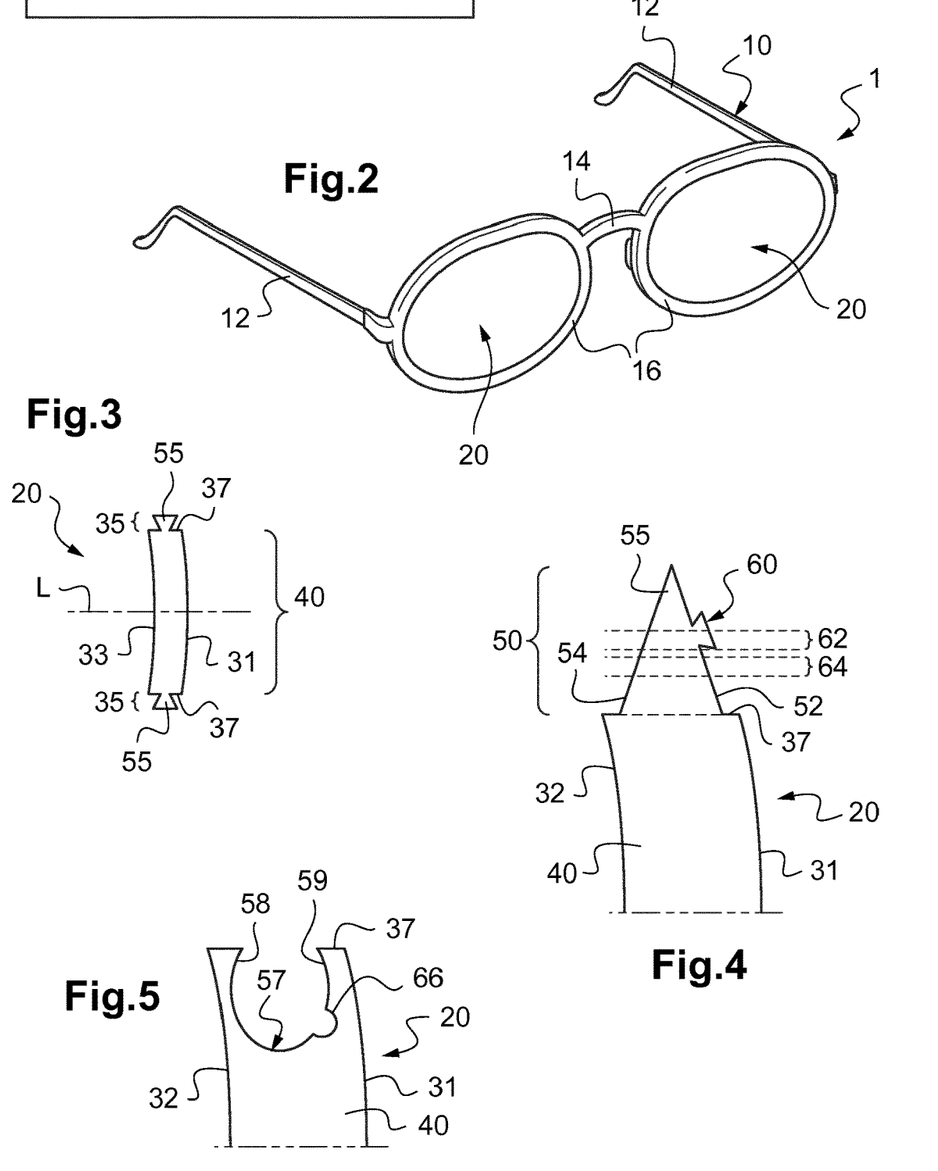
FIG. 2 is a schematic view in perspective of an eyeglasses equipment according to the invention.
FIG. 3 schematically shows a side view of an ophthalmic lens according to the invention.
FIG. 4 schematically shows a side view of a fixing means of the ophthalmic lens according to a first exemplary embodiment of the invention.
FIG. 5 schematically shows a side view of a fixing means of the ophthalmic lens according to a second exemplary embodiment of the invention.

As shown in FIG. 2, the invention applies more particularly to an eyeglasses equipment 1 including a frame 10 and two ophthalmic lenses 20 (also called lenses 20 hereinafter) mounted into the frame 10.

Each lens 20 may be a lens without any correction effect (for instance a lens for sunglasses) or a corrective lens (for instance, unifocal or bifocal or trifocal or progressive lens).

The invention applies particularly to full-rim frames and half-rim frames (also called "Nylor frames") made from plastic or metal. It may also apply to rimless frames.

Each type of frame (full-rim or half-rim or rimless frame) is associated with a specific fixing means to attach the lens 20.

For a full-rim frame, the fixing means usually comprises a bevel. For a half-rim frame, the fixing means usually comprises a groove and a nylon thread. In case of a rimless frame, a notch is drilled in a peripheral part of the lens 20 to fix the lens to the frame.

The present invention introduces a method for manufacturing an ophthalmic lens 20 to be mounted in a frame 10. The invention particularly describes the manufacturing of the fixing means adapted for fixing the lens 20 in the frame 10.

Figure 1:
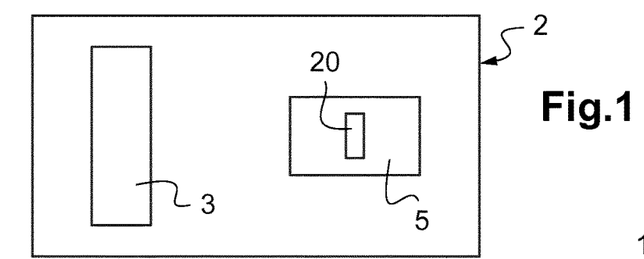
FIG. 1 shows an exemplary manufacturing system adapted to manufacture an ophthalmic lens according to the invention.

FIG. 1 shows a manufacturing system 2 adapted to manufacture an ophthalmic lens.

The manufacturing system 2 comprises a device 3 and a support 5. The device 3 is suitable for manufacturing the lens 20 using an additive manufacturing technology. The expression "additive manufacturing technology" refers to a manufacturing technology as defined in the International standard ASTM 2792-12, which mentions a process of joining materials to make objects from 3D model data, usually layer upon layer, as opposed to subtractive manufacturing methodologies, such as traditional machining. Solid objects are thus manufactured by juxtaposing volume elements (layers or voxels). In the case of the present invention, the ophthalmic lens is thus manufactured volume element by volume element, layer by layer.

The additive technology also called additive manufacturing method may be selected in, but is not limited to, the list consisting of stereolithography, mask stereolithography or mask projection stereolithography, polymer jetting, selective laser sintering or SLS, selective laser melting or SLM, fused deposition modeling or FDM. Additive manufacturing technologies comprise processes which create objects by juxtaposition of volume elements according to a pre-determined arrangement that can be defined in a CAD (Computer Aided Design) file.

Such juxtaposition is understood as the result of sequential operations such as building a material layer on top of a previously obtained material layer and/or juxtaposing a material volume element next to a previously obtained volume element. The primary advantage of this technique is its ability to create quickly and at a relatively low cost almost any shape or geometric feature.

The device 3 comprises a control unit (not shown in FIG. 1). This control unit includes a microprocessor and a memory. The memory stores instructions that allow the manufacturing system 2 to implement a method for manufacturing the ophthalmic lens as described below when these instructions are executed by the microprocessor.

As shown in FIG. 3, the ophthalmic lens 20 comprises an optical front face 31, an optical rear face 33 and a peripheral edge 35 that surrounds the optical front face 31 and the optical rear face 33.

We can define a central axis L of the lens as an axis that runs through the centers of the two optical faces of the lens. In the following, the phrase "in cross-section" will correspond to a section in a plane which includes this central axis L. The central axis L is shown in FIG. 3.

As shown in FIG. 3, a central part 40 of the lens 20 can be defined. The central part 40 comprises at least one of the optical front face 31 and the optical rear face 33. This central part 40 is a useful optical part. The expression "useful optical part" is understood to mean a part of the lens 20 that may be crossed by the wearer's gaze direction when the eyeglasses are worn by the wearer. In the case of a corrective lens, the useful optical part is adapted to modify the propagation and the transmission of an optical beam going through said lens. The useful optical part is thus a portion of the lens 20 adapted to the wearer's optical prescription.

In the following (except for FIG. 13), we will consider that the central part 40 comprises both optical faces of the lens 20 and the material situated between these two optical faces.

The peripheral edge 35 comprises a base portion 37 that surrounds the front and rear optical faces 31, 33. The base portion 37 is adapted for carrying a fixing means 50. The fixing means 50 is suitable for fixing the lens 20 to at least a part of the frame 10.

As explained further in more details, in the embodiments shown in FIGS. 4 to 8, the fixing means 50 comprises a strip 55, 57 that extends along the entire outline of the lens and which is shaped according to the type of the frame 10 (full-rim frame or half-rim frame as discussed previously). In the embodiments shown in FIGS. 10 to 12, the fixing means 50 comprises a notch 70, 72 or a protrusion 78 that extends along a minor part of the outline of the lens.

The manufacturing system 2 shown in FIG. 1 and previously described is suitable for executing a method for manufacturing a lens using the additive manufacturing technology.

The method begins with two steps of determining the central part 40 and the peripheral edge 35. During theses steps, the device 3 generates or receives manufacturing instructions. These manufacturing instructions may be generated in the microprocessor or stored in the memory. The manufacturing instructions comprise instructions for producing the lens 20. In particular, instructions for producing the central part 40 and the fixing means 50 of the lens 20 are defined before the beginning of the manufacturing. Alternatively, as explained further, manufacturing instructions can consist in manufacturing only a part of the thickness of the central part 40 and manufacturing the fixing means 50.

As an example, geometrical and optical features defining the useful optical surface can also be included in such instructions.

The step of receiving or acquiring a manufacturing set point during which manufacturing instructions are received initiates the manufacturing of the lens 20.

This manufacturing set point defines the final shape and features of the whole ophthalmic lens 20.

This manufacturing set point is then used to calculate a planned manufactured device. This planned manufactured device comprises both fixing means 50 and the central part 40.

The method then comprises the manufacturing of the central part 40 and the peripheral edge 35 together in one pass, using only the additive manufacturing technology. The step of manufacturing is thus based on the planned manufactured device previously.

As described previously regarding additive manufacturing, both steps of manufacturing are performed by juxtaposing continuously or discontinuously layers, drops, droplets or voxels of material. The central part 40 and the peripheral edge 35 (comprising the fixing means 50) are thus made from the same material in one-piece.

The second step of manufacturing includes the manufacturing of the fixing means 50, especially the strip.

According to a first example shown in FIG. 4, the strip of the fixing means 50 is in a bevel shape. This case corresponds to a full-rim frame. The bevel 55 longitudinally extends along at least a part of the base portion 37 of the peripheral edge 35. The strip is profiled, in a bevel shape as represented in FIG. 4, on the whole length of the peripheral edge 35. In this example, the cross-section of the strip does not vary along the length of the peripheral edge 35.

According to a second example shown in FIG. 5, the strip of the fixing means 50 is in a groove shape. This case corresponds to a half-rim frame. The groove 57 longitudinally extends along at least a part of the base portion 37 of the peripheral edge 35. In this case, the strip is profiled in a groove shape only on a part of the length of the peripheral edge 35. As the example represented in FIG. 5, the cross-section of the strip does not vary along the length of this part of the peripheral edge 35.

As shown in FIGS. 4 and 5, the strip in the bevel or groove shape comprises side faces 52, 54, 58, 59. These side faces 52, 54, 58, 59 are tilted with respect to the base portion 37 of the peripheral edge 35 (which base portion 37 is, in cross-section, parallel to the central axis of the lens).

In both cases of FIGS. 4 and 5, the fixing means 50 are reinforced as the strip also comprises an overhang portion 60, 66. This overhang portion 60, 66 is adapted to engage in a corresponding part of the frame 10. The overhang portion 60, 66 corresponds to a non-return mechanism that improves the maintaining of the lens strip in the frame 10. The lens 20 is thus entered by force into the frame 10. Using this overhang portion 60, 66 is more efficient than using only a groove or a bevel to fix the lens 20 to the frame 10.

The overhang portion 60, 66 is manufactured for this purpose. One can thus describe the shape of this overhang portion 60, 66. The overhang portion 60, 66 has a cross-section either recessed or projection in relief relative to side faces of the strip, above or below the base portion 37.

The overhang portion 60 in the case of a bevel shaped strip is represented in FIG. 4. In this case, the overhang portion 60 projects out one side face of the strip. Its cross-section has a dovetail shape.

As an alternative, the strip can be manufactured without the overhang portion 60, 66.

A first area 62 and a second area 64 of the strip (comprising the overhang portion 60) are defined. As shown in FIG. 4, the first area 62 is situated further from the base portion 37 of the peripheral edge 35 than the second area 64. This second area 64 is situated between the first area 62 and the base portion 37 of the peripheral edge 35. In order to produce the non-return mechanism, the width of the first area 62 is greater than the width of the second area 64.

Because the whole strip is profiled, the overhang portion 60 extends over the whole outline of the lens.

As an alternative represented in FIG. 5, the overhang portion 66 can be manufactured within the peripheral edge 35. The overhang portion 66 is thus recessed within one side face of the strip (and within the peripheral edge 35).

As an example, in the case of a half-rim frame, the strip is profiled but extends only along an upper part of the outline of the lens.

Using the overhang portion 60 entered by force into the frame 10 is advantageous to fix the lens 20 only to a part of the frame 10 and avoid necessarily using a nylon thread to maintain the lens 20 where the frame is not defined.

Figures 6, 7:
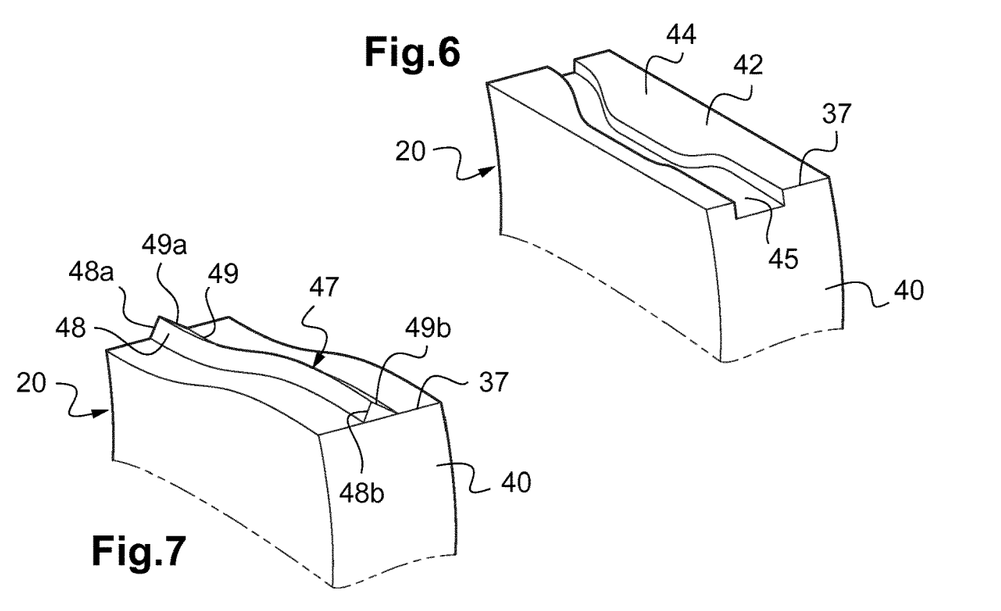
FIG. 6 schematically shows a view of the ophthalmic lens according to a third exemplary embodiment of the invention.
FIG. 7 schematically shows a view of the ophthalmic lens according to a fourth exemplary embodiment of the invention.

As an alternative shown in FIG. 6, the shape of the cross-section of the strip may vary along the length of the strip. In the case represented in FIG. 6, the strip is in a groove shape and the width of the groove 45 varies along the length of the strip. Moreover, the strip in a groove shape here extends over a longitudinal trace. As shown in FIG. 6, the distance of this longitudinal trace relative to the optical front face 31 varies along the length of the peripheral edge 35. This feature can be found in case of the strip in a bevel shape. As another example, the strip could have a dovetailed cross-section.

As another alternative, the slope of at least one of the side faces can vary along the length of the peripheral edge 35. As shown in FIG. 7, the strip is in a bevel shape. The bevel 47 comprises two side faces 48, 49. The slopes of these side faces 48, 49 vary along the length of the bevel. According to the example represented in FIG. 7, the slope of a first part 48a of the side face 48 is less tilted than a second part 48b of the same side face 48. In this example, the bevel is symmetrical. Thus, the slope of a third part 49a of the side face 49 is less tilted than a fourth part 49b of the same side face 49.

Figures 8, 9, 10:
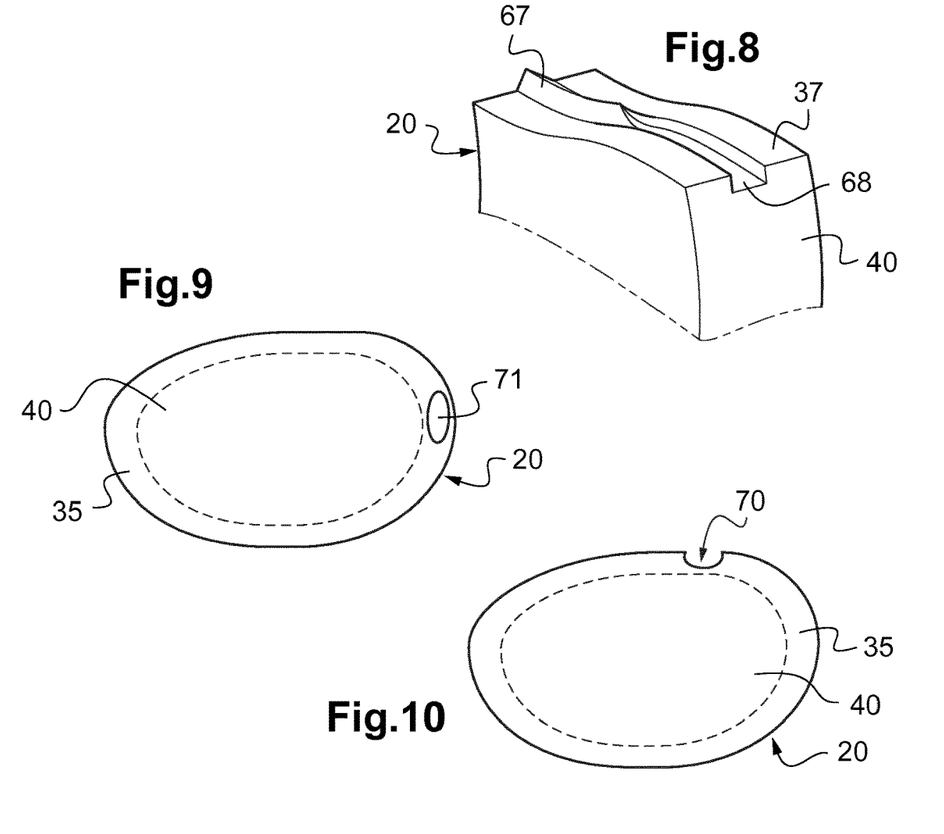
FIG. 8 schematically shows a view of the ophthalmic lens according to a fifth exemplary embodiment of the invention.
FIG. 9 schematically shows a front view of the ophthalmic lens according to a sixth exemplary embodiment of the invention.
FIG. 10 schematically shows a front view of the ophthalmic lens according to a seventh exemplary embodiment of the invention.

As another alternative shown in FIG. 8, the strip can be divided in two parts, a first part 68 and a second part 67. The first part 68 is manufactured in a groove shape and the second part 67 is manufactured in a bevel shape. Using the additive manufacturing technology makes easier the manufacturing of both profiles on the same strip simultaneously whereas the previous methods required manual heavy (and costly) operations to obtain them.

According to another embodiment shown in FIG. 9, the additive manufacturing technology allows to manufacture a clearance hole 71 in the peripheral edge 35. This clearance hole 71 is not drilled using another specific device. It is manufactured as the fixing means is formed layer by layer. As an example, the clearance hole 71 is adapted for fixing temples of the frame 10. As shown in this FIG. 9, the edge of the clearance hole 71 may be of any form to ensure a better fixation or to improve the aestheticism of the lens.

FIG. 10 represents another feasible way to define the fixing means 50. In this case, the fixing means 50 comprises a notch 70 recessed in the outline of the remainder of the lens outline. The notch 70 has a semi-circular or a semi-oblong shape. This notch 70 extends along a minor part of the length of the peripheral edge 35. In FIG. 10, the notch 70 as a recessed shape.

In the case represented in FIG. 10, the recessed notch has another shape. It is adapted for housing a locking means suitable for locking the lens 20 to the frame 10. As an example, the locking means can be a screw or a lug. In the example represented in FIG. 11, the locking means is a screw 75 inserted in the notch 72, which notch is a tapped hole obtained by additive technology. Using the combination of the notch and the locking means should be useful when the lens 20 is only slid in the frame 10. The combination of the notch and the locking means is thus a means to wedge the lens 20 in the frame 10.

Figures 11, 12, 13, 14, 15:
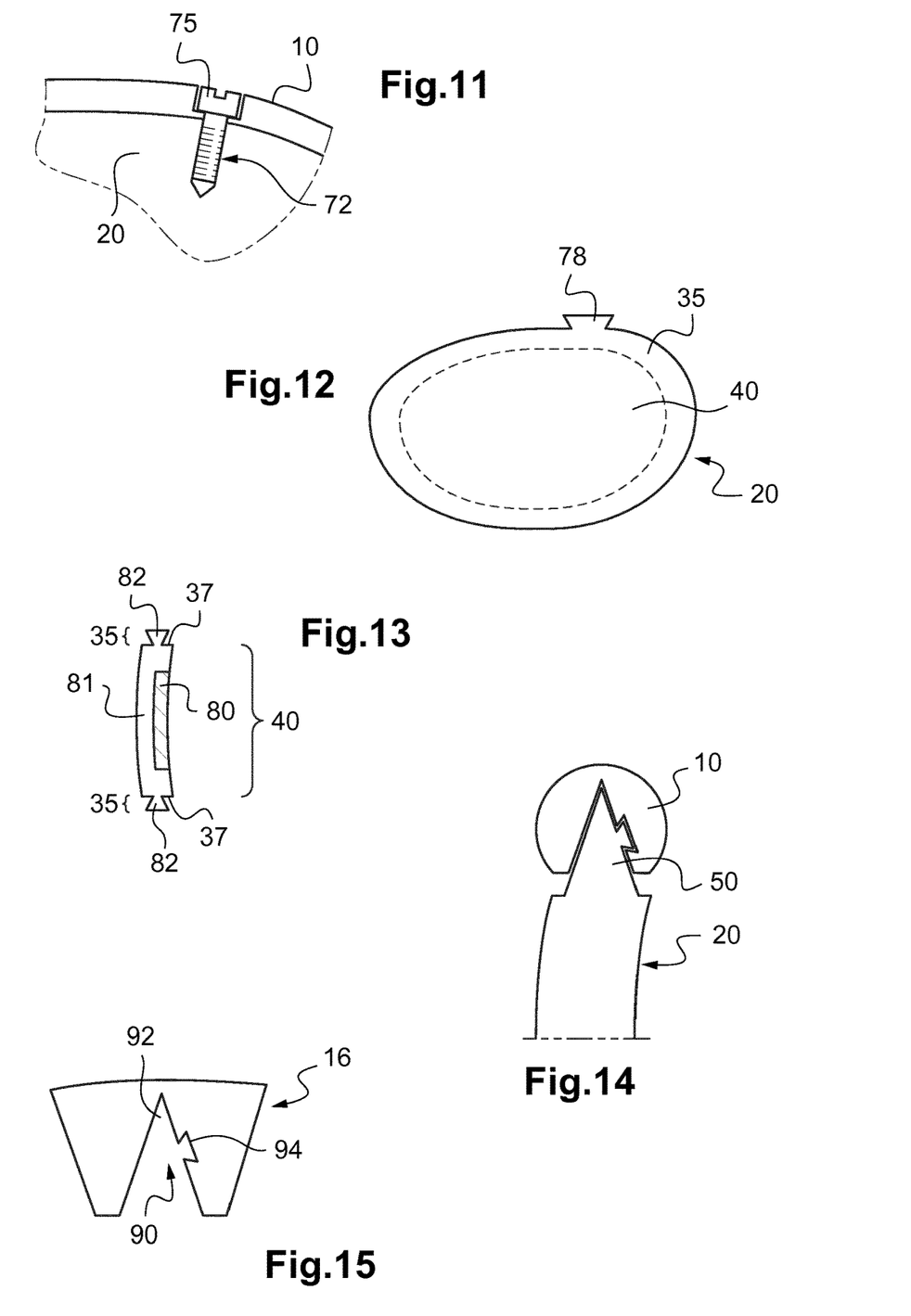
FIG. 11 schematically shows a front view of a locking means according to another embodiment of the invention.
FIG. 12 schematically shows a front view of the ophthalmic lens according to an eighth exemplary embodiment of the invention.
FIG. 13 schematically shows a side view of an ophthalmic lens according to a ninth exemplary embodiment of the invention.
FIG. 14 schematically shows a side view of the ophthalmic lens of FIG. 4 mounted in a frame.
FIG. 15 schematically shows a side view of a part of the frame according to the invention.

As an alternative shown in FIG. 12, the fixing means 50 comprises a projection 78. The projection 78 can have a dovetail shape, projecting from the remainder of the lens outline. This projecting shape can then enter by force into an appropriate hole formed in the frame 10 to fix the lens 20 in the frame 10.

In practice, the central part 40 and the peripheral edge 35 of the lens 20 including the fixing means 50 is built using the same material. As an alternative, they can be built using different materials, or using the same material processed in different ways so as to have different properties.

For instance, it may be useful to have a material having high absorbing light properties in the visible range for the peripheral edge, while the material used for the central part may be transparent, or may have different absorbing properties.

For instance, in order to limit the internal reflection on the lens edges, also called myopic rings, or to limit the amount of light coming through the lens edges, it may be interesting to use, for the peripheral edge, a high absorbing material that will absorb most of the visible wavelengths (from about 380 nm to 780 nm or at least from about 400 nm to 700 nm). This material can have similar refractive index compared to the central part material refractive index. However, in this alternative, it may have a higher refractive index than the central part so as to enable to reduce the total reflection occurring inside of the lens edges.

The high absorbing material thickness can be limited, for instance to less than 1 mm, advantageously less than 0.5 mm, preferably less than 0.1 mm. The thickness must be determined to be sufficient to provide absorption while not needing much more.

This high absorbing material can be use to build entirely the fixing means 50, in a groove or bevel shape, or may be used only as a part of the fixing means. For instance, in case of building a fixing means having a bevel shape, half of the bevel shape, for example an inner part, can be manufactured using the central part material, while the most outside part of the bevel is built using the high absorbing material. Alternatively, the high absorbing material can be only a layer of sensibly equal thickness positioned on the surface of the bevel or the groove. As another possible embodiment, the absorbing part is not necessarily on the most outside part of the peripheral edge of the lens, but can be embedded between some of the central part material layer present within or close to the fixing means. This embodiment may provide more efficient solution to reduce myopic rings, as the geometry of the high absorbing material can be managed independently of the fixing means.

As non limiting examples, a lens having at least two different materials can be built using inkjet technology, using for instance at least two printing heads providing different materials and building the whole lens within the same process via one single inkjet printer device.

As another non limiting example, the central part may be built with a first additive manufacturing technology (for instance stereolithography or inkjet) using a single material. The peripheral edge may be then built using a second additive manufacturing technology (stereolithography or inkjet), directly on the central part.

According to another embodiment, only a part of the thickness of the lens can be manufactured during this step (in this case, the "central part" only comprises one of the two optical faces of the lens). As represented in FIG. 13, one can imagine that a first portion 80 of the lens has been formed previously. The lens is then completed, adding a second portion 81 by additive manufacturing. As an example, if there is a change in the optical prescription of the wearer, the lens may be modified by adding a thickness of material on the remainder of the lens.

In this case, the second portion 81 of the lens comprises a part that covers the first portion 80 and the peripheral edge 35 (comprising the strip 82), which part and peripheral edge 35 are manufactured together in one pass. As an example, the first portion 80 can be a standard blank lens obtained from mass-production. According to a first example, the blank lens has a rear face with a final surface (the rear face is thus treated), adapted to be oriented toward a wearer when mounted in eyeglasses. The blank lens also comprises a front face. The second portion 81 is then manufactured by additive manufacturing on the front face with further material surrounding the blank lens on the edges. According to another example, the second portion 81 is deposited only on part of the rear face and only on part of the edges of the blank lens. Alternatively, the second portion 81 may be manufactured on the rear face or only on part of the front face.

Furthermore, it is to be noted that the first portion 80 may also be manufactured by additive manufacturing in a prior step.

The first portion 80 may also include added values, as described below, or may include an electro-optical system or part of such. In particular an "electro-optical system" is a system with a switchable function (active function) that enables at least a part of the active function of the system to be controlled by means of an electrical stimulus. The active function of the lens may be of various types. It may be a function of reinforcing contrast by adapting the tint of the lens, e.g. as described in U.S. Pat. No. 6,250,759, included by reference. It may also be a function adapted to reinforce the contrast by filtering light with a determined direction of polarisation. It may comprise a system having a variable light transmission. Such system may be of the electrochromic type. The active function of the lens may be a diffractive or holographic optical element. The active function of the lens may be brought in a pixelated form. The function provided by the electro-optic system may be of the Fresnel type or of the Alvarez and Lohmann refractive type controlled through activating liquid crystals or other electro-activated components. The electro-optical system may also be a display system arranged to display information over the real world view such as allowing realizing augmented reality device. In some embodiments, the electro-optical system may comprise a light-guide optical element.

At this point, the lens 20 is manufactured. Before mounting it in the frame 10, some steps of polishing can be performed. Firstly, the optical front and rear faces are polished to remove optical defects that can hinder the wearer. Another step of machining can be performed on the optical front and rear face.

Then, as an example, the lens can undergo post-manufacturing treatments such as adding a type of coating on the ophthalmic lens.

For example, the lens can be initially manufactured by additive manufacturing so as to form an intermediate optical device which comprises two main faces (a front face and a rear face) and a peripheral edge. Said intermediate optical device has at least a part of one of its two main faces that comprises a predetermined overlaying thickness of material compared to an expected final thickness of material for a final optical lens. The predetermined overlaying thickness of material is then submitted to a subtractive manufacturing step. Such step enables to obtain a final surface for this part of the lens.

According to a first example a digital surfacing turning machine or a milling machine may be used, often in conjunction with a polishing step, so as to define precisely the geometry of said surface. According to a second example, the predetermined overlaying thickness has a shape calculated so as to form the aforementioned final surface once submitted to a polishing step, without using any turning or milling machine. In further embodiments, the predetermined overlaying thickness of material is present over the whole of one or both of the main faces.

Those alternatives are described more in details in WO2014195654, and in WO2015086981, included by reference.

Post manufacturing treatments may also include the formation of added value layers such as the one known to the person skilled in the art of the optical industry, and especially in the ophthalmic industry. In particular, a non-exhaustive list of such added values may comprise any of the following added values, alone or in combination, on either or both of any of the two main faces: a smoothing layer, adapted to smooth any rough patch remaining from the manufacturing step, a polarised layer, a photochromic layer, a tinted layer, a filtering layer comprising one or more dyes or light absorbing components so as to absorb at least partially a chosen range of visible light or ultraviolet or infrared light, an anti-shock layer, often known in the art as a primer layer, a scratch protecting layer, also known as a hard coat layer, an antistatic layer, a mirror layer, adapted to reflect partially the visible light, an antireflective layer such as an antireflective interferential stack of layers or a microstructured surface, a topcoat layer such as a smudge protecting layer, an anti-fog, an hydrophobic layer, an oleophobic layer or an hydrophilic layer. It is to be noted that some of the added values may be comprised in a same given layer: for example, a hard coat or a primer may also include some filtering dyes, photochromic dyes or even form the tinted layer. As another example, the antireflective layer may include an antistatic layer.

Furthermore, some of the added values may be deposited by processes which are common in the ophthalmic industry or by an additive manufacturing process.

Further, it is to be noted that the additive manufacturing step of the invention, prior to said post-manufacturing treatments, may include the additive manufacturing of some of the listed added values.

According to the above-mentioned embodiment in which the ophthalmic lens comprises a first portion 80 realised prior to the additive manufacturing step of the invention, the first portion 80 may carry initially some of the above-mentioned added values, either on the whole first portion 80 or on any of its faces, depending on the application.

When the ophthalmic lens 20 is completed (including post-manufacturing treatments), it is mounted in the frame 10.

As shown in FIG. 2, the frame 10 comprises a bridge 14, two rims 16, temples 12 and attaching means. The rims 16 surround each ophthalmic lens 20. The bridge 14 links the two rims 16. The attaching means are located in each rim 16.

The attaching means are suitable for fixing the ophthalmic lenses 20. Each attaching means is designed so as to have a complementary shape to the fixing means 50 of the corresponding lens 20. FIG. 14 represents the interlocking of the fixing means 50 of the lens 20 into the attaching means of the frame 10 when the fixing means 50 comprises a bevel (as previously shown in FIG. 4).

As shown in FIG. 15, the attaching means 90 thus comprises a relief pattern 92. This relief pattern 92 has a recessed shape. The shape of the relief pattern 92 is adapted for matching the fixing means 50 of the lens 20. In particular, the relief pattern 92 comprises a strip that longitudinally extends along the rim 16 and an overhang portion 94.

The relief pattern 92 also comprises a strip. This strip is adapted to match the strip shaped on the peripheral edge 35 of the lens 20. The strip may be in a recessed shape to fit the fixing means 50 of a lens 20 such as the one represented in FIG. 3 or 4. For example, as represented in FIG. 15, the strip may be in a bezel shape.

In order to fit the fixing means 50 of the lens 20, the strip of the frame 10 extends longitudinally along the whole rim 16, for example in the case of a full-rim frame. In the case of half-rim frames, the strip of the frame 10 extends longitudinally along only a part of the rim 16.

In a variant, the relief pattern 92 may have a projecting shape, for instance to match the fixing means 50 of a lens 20 such as the one represented in FIG. 5.

It is to be noted that in some variants the ophthalmic lens may be manufactured together with a holder which is destined to be separated from the ophthalmic lens. In that case, the fixing means, the central part of the lens and the holder are manufactured together at the same time in a same planned additive manufactured device. Accordingly, manufacturing files or manufacturing instructions comprises instructions to manufacture sensibly in a simultaneous manner the central part, the fixing means and the holder.

As for the other embodiments of the invention, the manufacturing can then be operated by a continuous injection of material through an injection nozzle of the machine. In this way, the manufacturing instructions are preferably generated to ensure no interruption of material injection, or interruption less than 1 second.

The holder may in particular be a holder destined to enable to fix the additively manufactured device into at least a further machine for a post processing treatment of the one defined above (a polishing treatment, . . . ).

The holder may also or in alternative be a holder destined to cooperate with the additively manufactured device during the additive manufacturing step in order to maintain the additively manufactured device in a chosen position, the additively manufactured device and the holder being additively manufactured in a same step. In particular, such holder is maintained in contact with the ophthalmic lens at least on part of the edges of the ophthalmic lens.

The holder may be a frangible holder, held to the ophthalmic lens through a frangible or fragile part, or a thin and easily cut or broken part.

The holder may further overlay part or all of the fixing means on part or all of the contour of the ophthalmic lens. In that case, however, within the scope of the invention the fixing means are still calculated, and manufactured by additive manufacturing. Accordingly, the holder may be fixed to the ophthalmic lens, its edges or part of the fixing means in a way that still enable to remove the holder in a post processing step so as to reveal or free the already pre-manufactured the fixing means. Alternatively, the holder may need to be cut-off the lens. In that case the cutting of the holder from the lens doesn't form the fixing means. For example, the whole contour of the lens may need to be cut, however in that case the fixing means are within the central part, for example fixing means enable to mount lenses on non-circled frames (also called "half-rimmed frames") or pierced frames (also called "drilled frames" or "non-rimmed frames"). Alternatively, the holder may be linked to the lens using on part of the contour of the lens a number of junctions that need to be cut, the act of cutting those junctions not modifying substantially the already formed fixing means when compared to part of the contour that do not comprise said junctions.

It will be appreciated that one or more of the above embodiments may be combined with one or more of the other embodiments, unless explicitly stated otherwise. The invention illustratively disclosed herein suitably may be practiced in the absence of any element or step that is not specifically disclosed. Furthermore, no limitations are intended to the details of construction, composition, design, or steps herein shown.

The invention claimed is:

1. A method for manufacturing an ophthalmic lens to be mounted in a frame, the ophthalmic lens including an optical front face, an optical rear face, and a peripheral edge that surrounds said optical front face and the optical rear face and that has a base portion carrying an attachment system configured to attach the ophthalmic lens to at least a part of the frame, the method comprising:
   determining a central part of the ophthalmic lens that includes at least one of the optical front face and the optical rear face;
   determining the peripheral edge with said attachment system;
   calculating a planned manufactured device comprising both the attachment system and said central part together; and
   manufacturing, using an additive manufacturing technology, said planned manufactured device to form the ophthalmic lens,
   wherein the central part and the peripheral edge of the ophthalmic lens are manufactured using different materials.

2. The method according to claim 1, wherein said attachment system comprises a strip in a groove shape or bevel shape that longitudinally extends along at least a part of the base portion of said peripheral edge, said strip comprising at least one overhang portion.

3. The method according to claim 2, wherein said overhang portion has a cross-section along a plane which is perpendicular to the strip, said cross-section having a width that is greater in a first area situated further from the base portion of the peripheral edge than in a second area of thinner width situated between the first area and said base portion of the peripheral edge.

4. The method according to claim 1, further comprising, after the manufacturing:
   polishing at least a part of the front face or the rear face of the ophthalmic lens; and
   polishing a part of the peripheral edge.

5. The method according to claim 1, further comprising, after the manufacturing, a machining at least a part of one or more of the front face and the rear face of the ophthalmic lens.

6. The method according to claim 1, wherein the manufacturing is performed by continuously or discontinuously juxtaposing layers or voxels of material.

7. An ophthalmic lens to be mounted in a frame, the ophthalmic lens comprising:
   an optical front face;
   an optical rear face; and
   a peripheral edge that surrounds said optical front face and the optical rear face and that has a base portion carrying an attachment system configured to fix the ophthalmic lens to at least a part of the frame,
   wherein the attachment system and a central part of the ophthalmic lens that includes at least one of the optical front face and the optical rear face are formed as one-piece using only an additive manufacturing technology, and
   the central part and the peripheral edge of the ophthalmic lens are made of different materials.

8. The ophthalmic lens according to claim 7, wherein said attachment system comprises a strip in a groove shape or a bevel shape that longitudinally extends along at least a part of the base portion of said peripheral edge, said strip comprising at least one overhang portion.

9. The ophthalmic lens according to claim 8, wherein said overhang portion has a cross-section along a plane which is perpendicular to the strip, said cross-section having a width that is greater in a first area situated further from the base portion of the peripheral edge than in a second area of thinner width situated between the first area and said base portion of the peripheral edge.

10. The ophthalmic lens according to claim 8, wherein the strip or a part of the strip has a dovetailed cross-section.

11. The ophthalmic lens according to claim 8, wherein the overhang portion extends over the major part of the length of the strip.

12. The ophthalmic lens according to claim 8, wherein the shape of the cross-section of the strip varies along the length of the strip.

13. The ophthalmic lens according to claim 7, wherein said attachment system is manufactured with an asymmetrical shape.

14. The ophthalmic lens according to claim 7, wherein the attachment system comprises a notch that has a projecting or recessed shape and that extends along only a minor part of the length of the peripheral edge.

15. The ophthalmic lens according to claim 14, wherein the notch has a recessed shape and houses a fastener configured to lock the ophthalmic lens to the frame.

16. The ophthalmic lens according to claim 15, wherein said fastener is a screw or a lug.

17. The ophthalmic lens according to claim 7, wherein said attachment system comprises a strip in a groove shape or a bevel shape that comprises side faces, said side faces being tilted, the slope of at least one of said faces varying along the length of said peripheral edge.

18. The ophthalmic lens according to claim 7, wherein said attachment system comprises a strip in a groove shape or a bevel shape that extends over a longitudinal trace, the distance of said longitudinal trace relative to said optical front face varying along the length of said peripheral edge.

19. The ophthalmic lens according to claim 7, wherein said attachment system comprises a strip in a groove shape or a bevel shape that comprises at least a first part and a second part, the first part being groove-shaped and the second part being bevel-shaped.

20. Eyeglasses equipment comprising:
   the ophthalmic lens according to claim 7; and
   a frame comprising
      a bridge;
      temples; and
      an attachment system configured to fix the ophthalmic lens, the attachment system comprising a relief pattern that has a projecting or recessed shape and that comprises at least one overhang portion.

21. The frame according to claim 20, wherein said relief pattern has a dovetailed cross-section.

22. The frame according to claim 20, further comprising a rim configured to surround at least a part of said ophthalmic lens, wherein said relief pattern comprises a strip in a groove shape or a bevel shape that longitudinally extends along at least a part of the rim.

\* \* \* \* \*